United States Patent
Buckner

(10) Patent No.: US 10,450,771 B2
(45) Date of Patent: Oct. 22, 2019

(54) UTILITY POLE SETTING TRAILER

(71) Applicant: Don M. Buckner, Okahumpka, FL (US)

(72) Inventor: Don M. Buckner, Okahumpka, FL (US)

( * ) Notice: Subject to any disclaimer, the term of this patent is extended or adjusted under 35 U.S.C. 154(b) by 0 days.

(21) Appl. No.: 15/355,471

(22) Filed: Nov. 18, 2016

(65) Prior Publication Data

US 2018/0142492 A1    May 24, 2018

(51) Int. Cl.
| | |
|---|---|
| *E04H 12/34* | (2006.01) |
| *B66C 1/42* | (2006.01) |
| *B60P 3/40* | (2006.01) |
| *B66C 1/68* | (2006.01) |
| *B66C 23/44* | (2006.01) |
| *B60P 1/54* | (2006.01) |

(52) U.S. Cl.
CPC .......... *E04H 12/347* (2013.01); *B60P 1/5423* (2013.01); *B60P 3/40* (2013.01); *B66C 1/427* (2013.01); *B66C 1/68* (2013.01); *B66C 23/44* (2013.01)

(58) Field of Classification Search
CPC ......... E04H 12/347; B60P 3/40; B66C 1/427; B66C 23/00
USPC .............................................. 414/10–12, 23
See application file for complete search history.

(56) References Cited

U.S. PATENT DOCUMENTS

| | | | |
|---|---|---|---|
| 2,701,649 A | 2/1955 | Hallstrom | |
| 2,727,758 A * | 12/1955 | Smith | ........................ B60P 3/40 280/656 |
| 2,814,396 A | 11/1957 | Neale, Sr. | |
| 2,821,311 A | 1/1958 | Screws | |
| 3,112,037 A | 11/1963 | Thiermann | |
| 3,133,651 A * | 5/1964 | Cripe | ........................ B60P 3/40 280/421 |
| 3,154,200 A | 10/1964 | Versch et al. | |
| 3,161,301 A * | 12/1964 | Versch | .................... E04H 12/34 414/23 |
| 3,263,834 A | 8/1966 | Tendresse | |
| 3,301,416 A * | 1/1967 | Bopp | .................... B60P 1/5466 212/199 |
| 4,280,785 A * | 7/1981 | Albrecht | ................. B66C 13/08 294/103.1 |
| 4,669,145 A * | 6/1987 | Kehr | .................... B65H 75/425 |
| 5,256,005 A * | 10/1993 | Beck, III | ................ E02D 15/04 405/233 |
| 5,425,188 A * | 6/1995 | Rinker | ................... B01D 45/06 175/206 |

(Continued)

*Primary Examiner* — Lynn E Schwenning

(74) *Attorney, Agent, or Firm* — Matthew G. McKinney, Esq.; Allen, Dyer et al.

(57) ABSTRACT

A utility pole setting trailer includes a horizontal frame configured to carry utility poles to remote locations, a set of wheels supporting the horizontal frame, a hydraulic boom coupled to the horizontal frame and configured to load and unload the utility poles on to the horizontal frame, and a motor coupled to the hydraulic boom and configured to power the hydraulic boom. The hydraulic boom includes a first arm and a second arm, and a grapple is coupled to a distal end of the second arm. The grapple is configured to grasp a respective utility pole. In addition, the horizontal frame includes a front portion and a rear portion that are configured to extend apart from each other to increase a length of the horizontal frame.

14 Claims, 4 Drawing Sheets

(56) References Cited

U.S. PATENT DOCUMENTS

| | | | | |
|---|---|---|---|---|
| 6,527,250 B1* | 3/2003 | Tyson | ............... | E04H 17/265 |
| | | | | 254/30 |
| 6,857,837 B2* | 2/2005 | Rajewski | ............. | E02F 3/8816 |
| | | | | 37/323 |
| 6,966,448 B1 | 11/2005 | Burkett | | |
| 7,448,838 B2 | 11/2008 | Bunting | | |
| 7,503,134 B2* | 3/2009 | Buckner | ............... | E01H 1/0827 |
| | | | | 15/300.1 |
| 8,444,361 B1* | 5/2013 | Hershey | ............... | A01G 23/006 |
| | | | | 254/324 |
| 2004/0194354 A1* | 10/2004 | Haugen | ................ | E01B 27/04 |
| | | | | 37/317 |
| 2005/0161654 A1* | 7/2005 | Ancell | ................ | B66F 9/065 |
| | | | | 254/334 |
| 2006/0119080 A1* | 6/2006 | Damron | ............... | A01G 23/095 |
| | | | | 280/656 |
| 2007/0134075 A1* | 6/2007 | Bunting | ................ | B66C 1/585 |
| | | | | 414/23 |
| 2015/0093217 A1* | 4/2015 | St-Yves | ................ | B25J 15/024 |
| | | | | 414/23 |

\* cited by examiner

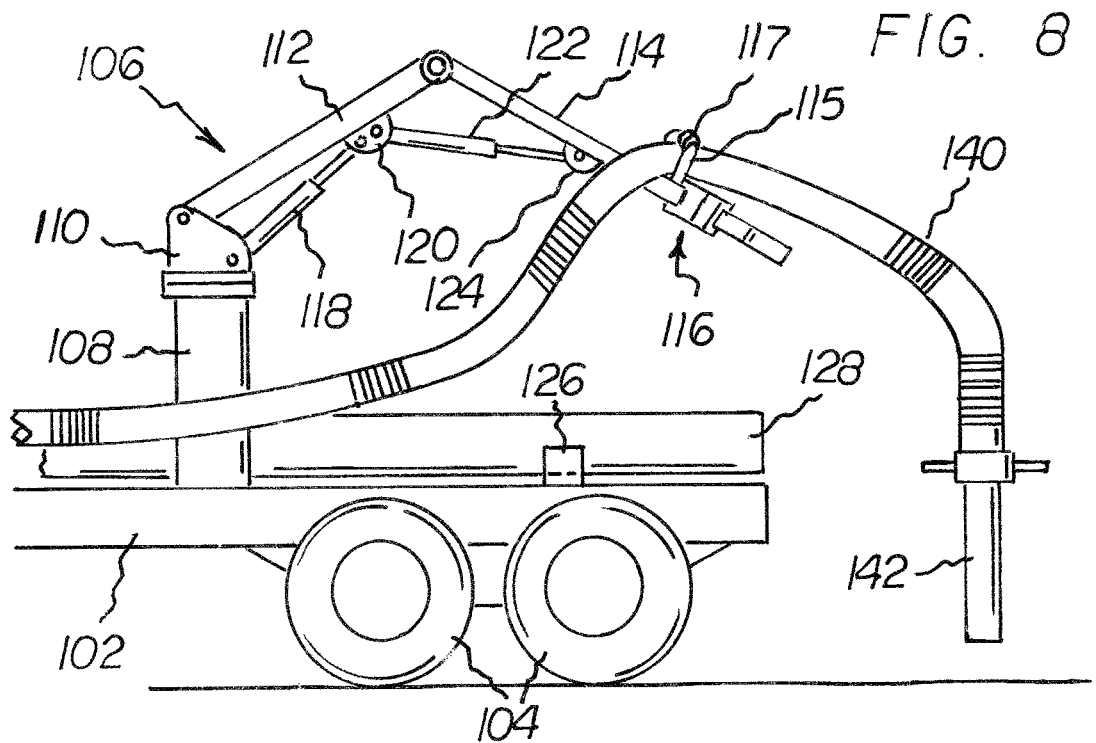
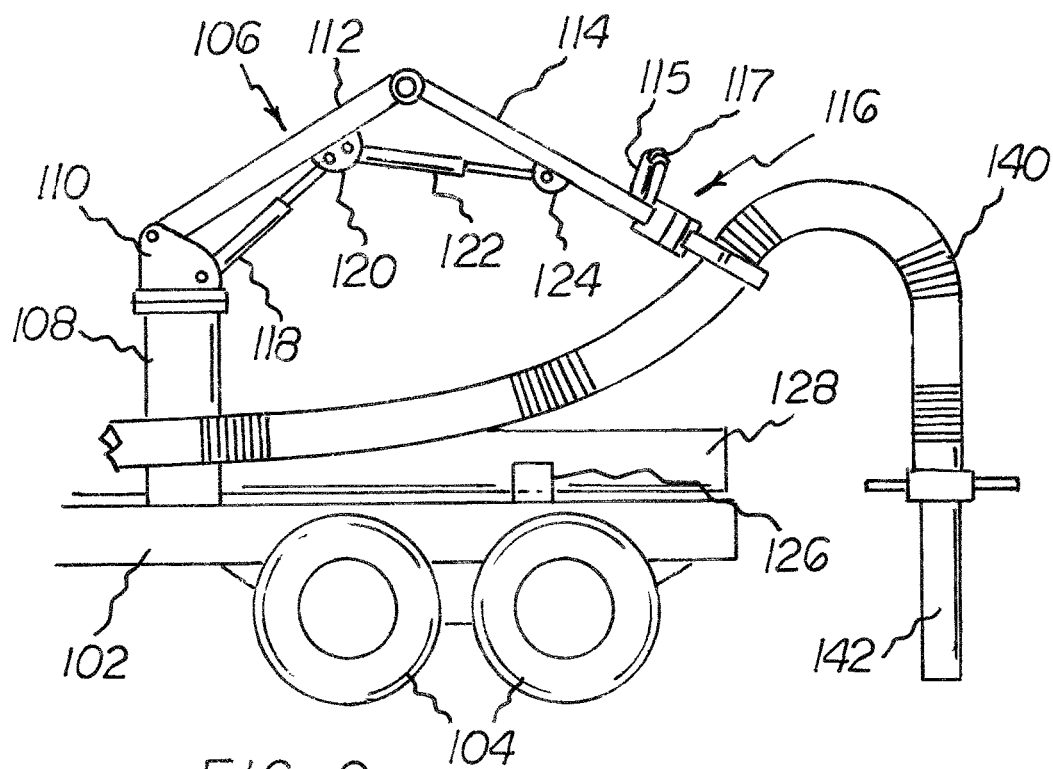

UTILITY POLE SETTING TRAILER

FIELD

The present invention relates to the field of wheeled trailers, and, more particularly, to a utility pole setting trailer.

BACKGROUND

Wheeled trailers are often used for the transportation of utility poles, such as those used by power or telephone companies. The utility poles are transported to the site of erection and unloaded from the trailer. A conventional line truck is typically equipped with a crane for pole-setting operations so that the utility poles can be elevated into position over the holes in which they are to be erected, and lowered into the holes.

The loading of the utility poles upon the trailer is typically performed with the expenditure of a substantial amount of time and labor. Additionally, a conventionally equipped line truck is awkward to maneuver, and is of heavy weight, thus making the use of the truck in soft ground difficult. Still further, in many instances ditches must be crossed, since most power lines are built on the edge of a road right-of-way. Thus, it becomes necessary to move the line truck across the ditch in order that it may be properly positioned to set the pole in its hole.

In view of the shortcomings of the conventional trailers, it is an object of the present invention to provide a wheeled trailer that does not require a line truck for pole setting operations, and is equipped as to permit the loading of utility poles thereon, and the elevation of the utility poles over the holes, as well as the lowering of the utility poles into the holes, with a speed and efficiency which has not heretofore been possible in equipment of this type.

Still another object is to provide a trailer that is suitable not only for the transportation and setting of utility poles of differing lengths and setting, but also for hoisting a hose that can be used to excavate the hole for the utility poles.

SUMMARY

In view of the foregoing background, it is therefore an object of the present invention to provide a utility pole setting trailer that is configured to be self-contained and adjustable. This and other objects, features, and advantages in accordance with the present invention are provided by a utility pole setting trailer that includes a horizontal frame configured to carry utility poles to remote locations, a set of wheels supporting the horizontal frame, a hydraulic boom coupled to the horizontal frame and configured to load and unload the utility poles on to the horizontal frame, and a motor coupled to the hydraulic boom and configured to power the hydraulic boom. The hydraulic boom includes a first arm and a second arm, and a grapple is coupled to a distal end of the second arm. The grapple is configured to grasp a respective utility pole. In addition, the horizontal frame includes a front portion and a rear portion that are configured to extend apart from each other to increase a length of the horizontal frame.

In another embodiment, a utility pole setting trailer includes a debris tank, and a hose secured to the hydraulic boom and having a first end and a second open end. The first end is coupled to the debris tank, where the second open end of the hose is configured to excavate a hole for a respective utility pole. In addition, a hose holder is secure to and extends from the hydraulic boom. The hose holder includes an opening therethrough configured to support the hose therein. In a particular illustrative embodiment, the hose holder is a U-shaped band. In addition, the hose holder includes a first end and a second end, where the first end is removable from the hydraulic boom to access the opening of the hose holder to insert or remove the hose.

BRIEF DESCRIPTION OF THE DRAWINGS

FIG. 8 is an elevation view of the hydraulic boom positioning a hose; and

FIG. 9 is an elevational view of a grapple of the hydraulic boom positioning the hose.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
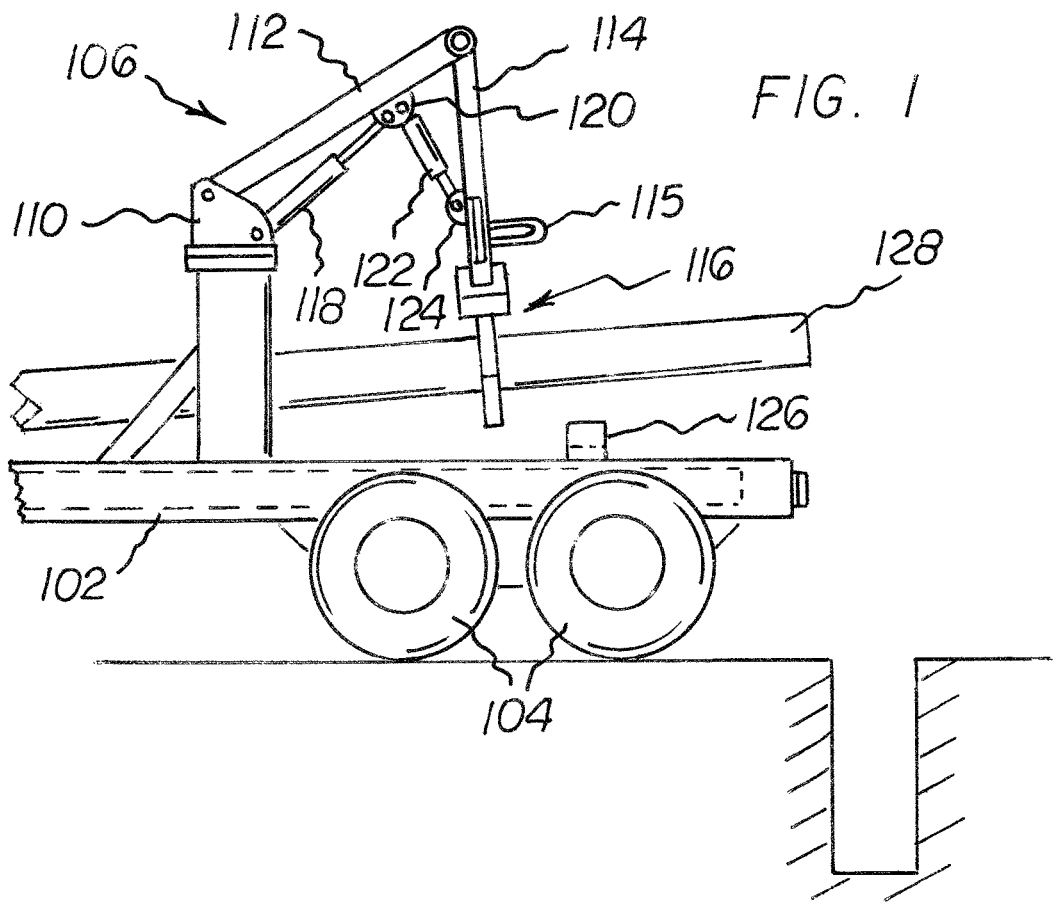
FIG. 1 is an elevational view of a rear portion of a utility pole setting trailer.
Figure 2:
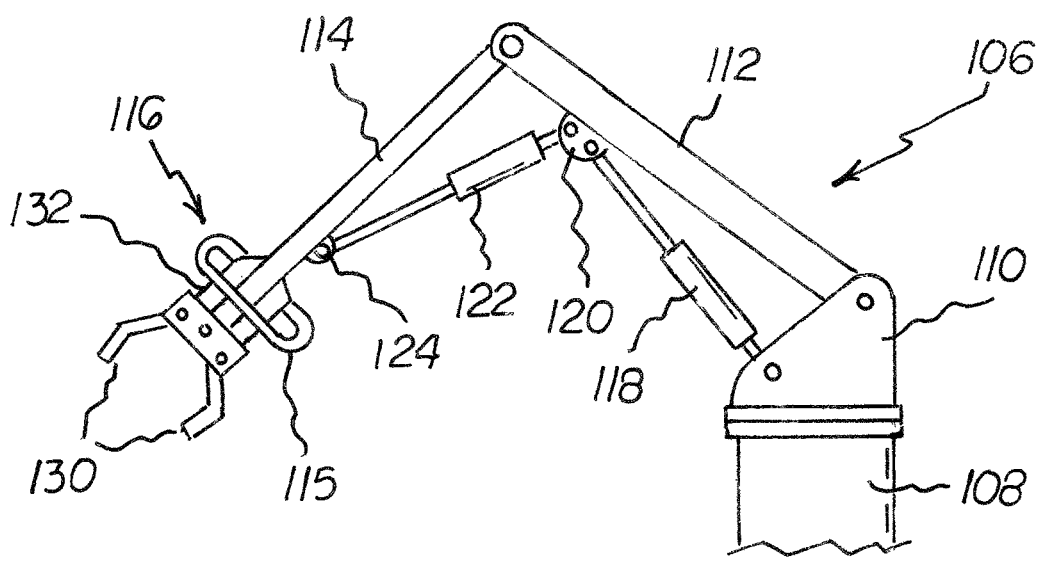
FIG. 2 is an elevational view of the hydraulic boom of the trailer of FIG. 1.

Referring initially to FIG. 1 and FIG. 2, a rear portion of a utility pole setting trailer 100 is shown. The utility pole trailer includes a horizontal frame 102 that is configured to carry utility poles 128 to remote locations. The horizontal frame 102 is supported by a set of wheels 104. Also shown in FIG. 1 is a hydraulic boom 106 that is mounted to a top of a post 108, which is secured to the horizontal frame 102. The hydraulic boom 106 is configured to rotate about the post 108 using a turntable bearing 110. The hydraulic boom 106 is used to load the utility poles 128 on to the horizontal frame 102 and to lift the utility poles 128 off the trailer 100 and set in a hole. The utility poles 128 are secured between bolsters 126 on the horizontal frame 102.

The hydraulic boom 106 includes a first arm 112 and a second arm 114. The first arm 112 has a distal end pivotally coupled to a proximal end of the second arm 114. A first hydraulic ram 118 is connected between a first arm support 120 and the turntable bearing 110 of the hydraulic boom 106. A second hydraulic ram 122 is connected between the first arm support 120 and a second arm support 124. The turntable bearing 110 is configured to rotate using hydraulics when positioning the hydraulic boom 106.

A grapple 116 is connected at a distal end of the second arm 114 and is used to grip and hold the utility pole 128 when being maneuvered by the hydraulic boom 106. In addition, a hose holder 115 is secured to the hydraulic boom 106 above the grapple 116 and on the second arm 112. The grapple 116 includes jaws 130 and a gripper hydraulic ram 132 configured to open and close the jaws 130 around the respective utility pole 128.

Referring now to FIGS. 3-6, the utility pole trailer 100 includes a motor 134 coupled to the hydraulic boom 106 and turntable bearing 110, and the motor 134 is configured to power the hydraulic boom 106 and turntable bearing 110 via hydraulic cables. The motor 134 may be carried by the horizontal frame 102. Alternatively, the hydraulic boom 106 may be powered by a towing vehicle engine using a power take off (PTO) 138 as shown in FIG. 7.

Figure 3:
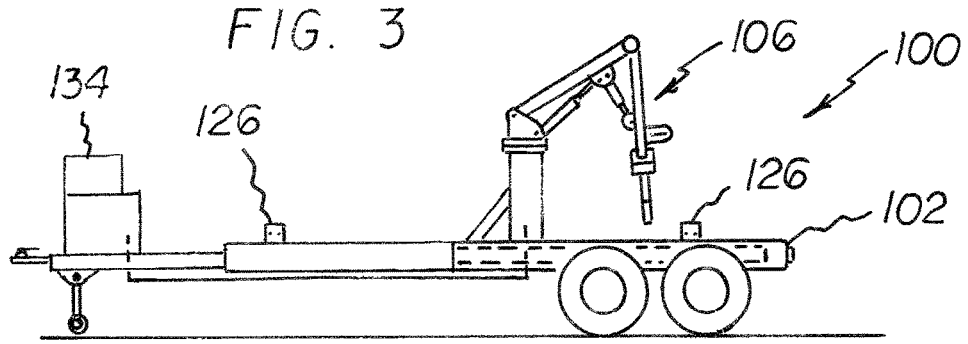
FIG. 3 is an elevational view of the utility pole setting trailer in a first position.
Figure 4:
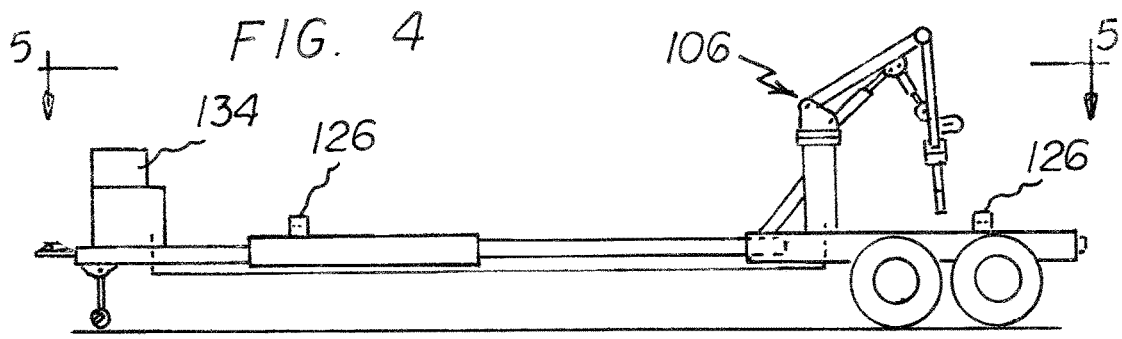
FIG. 4 is an elevational view of the utility pole setting trailer in an extended position.
Figure 5:
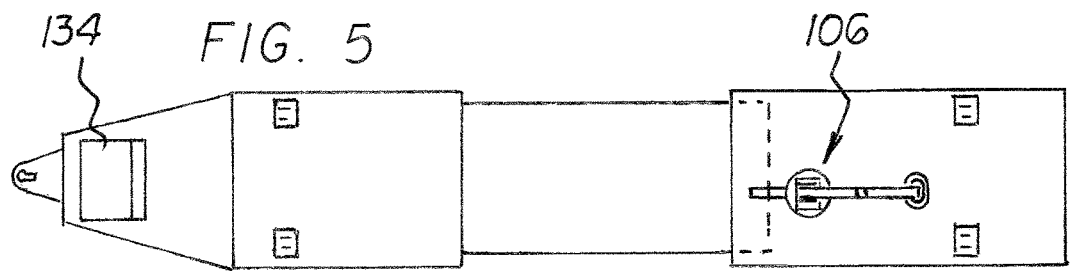
FIG. 5 is a top view of the utility pole setting trailer taken in the direction of line 5-5 of FIG. 4.
Figure 6:
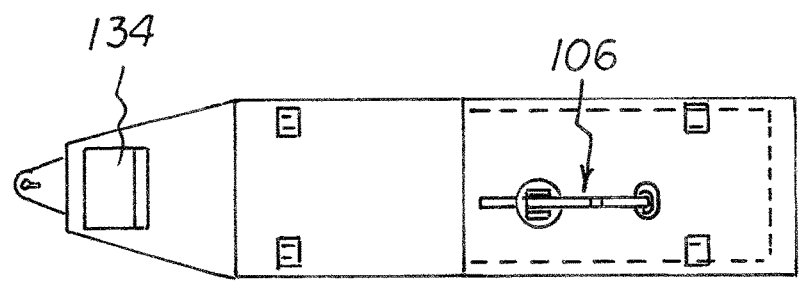
FIG. 6 is a top view of the utility pole setting trailer.

The utility pole setting trailer 100 is configured to extend to accommodate different lengths of utility poles 128. For example, the horizontal frame 102 may include a front portion and a rear portion, where the front portion and the rear portion are configured to extend apart from each other to increase a length of the horizontal frame 102. For example, as shown in FIGS. 3 and 6, the horizontal frame 102 is in the compressed position with the rear and front portions pushed together. In contrast, the rear and front portions are extended apart from each other, as shown in FIGS. 4 and 5, in order to increase the overall length of the utility pole setting trailer 100. The dashed lines in FIGS. 3-6 indicate where the front portion slides into the rear portion of the rectangular frame 102.

Figure 7:
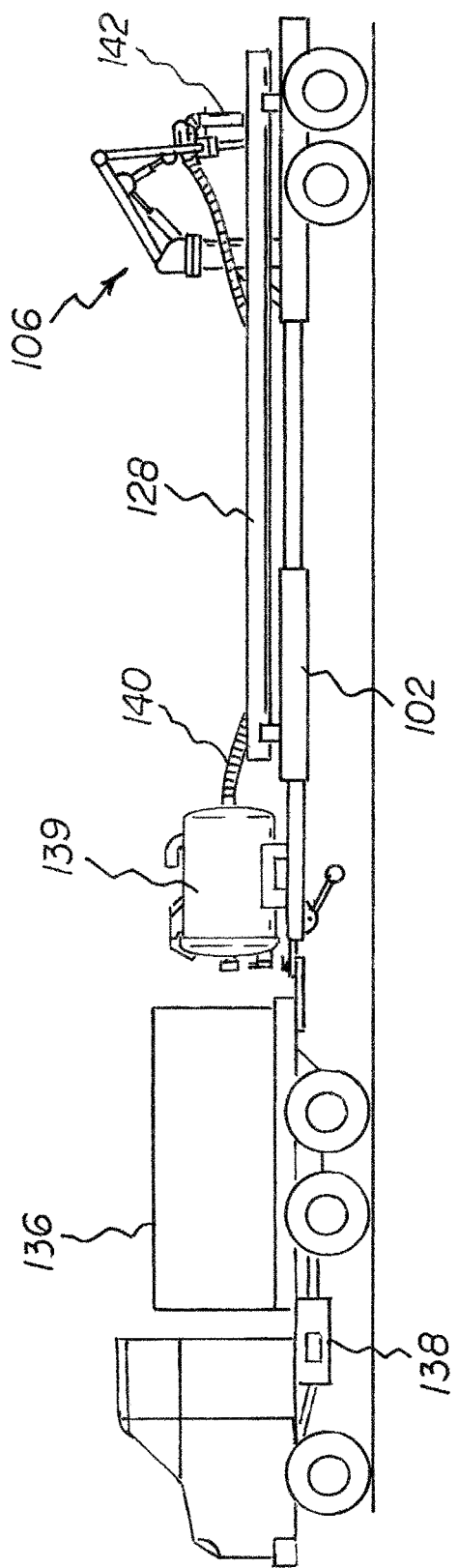
FIG. 7 is an elevational view of the utility pole setting trailer coupled to a towing vehicle.

The towing vehicle 136 is shown in FIG. 7, and is used to tow the utility pole setting trailer 100. The power take off (PTO) 138 is powered by the engine of the towing vehicle 136 in order to power the hydraulic boom 106.

In addition, the utility pole setting trailer may carry a debris tank 139 and hose 140. The hose 140 is secured to the hydraulic boom 106 and having a first end coupled to the debris tank 139 and a second end coupled to a suction wand 142. The hose 140 and suction wand 142 are configured to excavate a hole for a respective utility pole 128. In order to assist in maneuvering the hose 140, the hose holder 115 extends from the hydraulic boom 106 and is configured to secure the hose 140 to the hydraulic boom 106 through an opening of the hose holder 115. The hose holder may be a U-shaped band and may also include a clamp 117 that can be opened in order to secure the hose 140 therein, or remove the hose 140 from the hydraulic boom 106.

Accordingly, the hose 140 moves with the hydraulic boom 106, which makes it easier for a worker to position the suction wand 142. After the hole is excavated (as shown in FIG. 1), the hydraulic boom 106 can be used to pick up the utility pole 128 from the trailer using the grapple 116 and place the utility pole 128 into the hole in an upright position.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A utility pole setting trailer to be pulled by a vehicle, the trailer for carrying a hydro excavation unit connected to an excavation hose, the trailer comprising:
   a horizontal frame having a stationary portion and an extendable portion to increase a length of the horizontal frame, the horizontal frame configured to carry a plurality of utility poles to remote locations;
   a set of wheels supporting the horizontal frame, the set of wheels configured to roll along a ground surface;
   a post fixed to the extendable portion of the horizontal frame;
   a hydraulic boom having a first end coupled to a top of the post and configured to rotate about the post and the hydraulic boom having a free second end configured to load the plurality of utility poles on to the horizontal frame and to lift each utility pole off the trailer and set in a respective hole, the hydraulic boom having a top side facing away from the ground surface;
   a grapple coupled to the free second end of the hydraulic boom, the grapple configured to grasp a respective utility pole;
   a hose holder securing the excavation hose to the top side of the hydraulic boom and set back from the grapple a distance along a length of the hydraulic boom; and
   a motor coupled to the hydraulic boom and configured to power the hydraulic boom.

2. The utility pole setting trailer of claim 1, wherein the motor is carried by the horizontal frame.

3. The utility pole setting trailer of claim 1, wherein the motor to power the hydraulic boom is coupled to a power take off (PTO) of a towing vehicle.

4. The utility pole setting trailer of claim 1, wherein the grapple comprises a hydraulic ram configured to open and close the grapple around the respective utility pole.

5. The utility pole setting trailer of claim 1, further comprising:
   a hydro excavation unit carried by the trailer, and
   an excavation hose connected to the hydro excavation unit, wherein the excavation hose is secured to the hydraulic boom through the hose holder.

6. The utility pole setting trailer of claim 1, wherein the hose holder comprises an opening therethrough configured to support an excavation hose therein.

7. The utility pole setting trailer of claim 6, wherein the hose holder comprises a clamp to access the opening of the hose holder to insert or remove the excavation hose.

8. The utility pole setting trailer of claim 1, wherein the hose holder comprises a U-shaped band.

9. The utility pole setting trailer of claim 1, further comprising a pair of bolsters secured to the horizontal frame and configured to support a utility pole therebetween.

10. A utility pole setting trailer to be pulled by a vehicle, the trailer for carrying a hydro excavation unit connected to an excavation hose, the trailer comprising:
   a horizontal frame having a stationary portion and an extendable portion to increase a length of the horizontal frame, the horizontal frame configured to carry utility poles to remote locations along a ground surface;
   a hydro excavation unit carried by the horizontal frame;
   an excavation hose connected to the hydro excavation unit;
   a post fixed to the extendable portion of the horizontal frame;
   an articulated hydraulic boom having a first end coupled to a top of the post and configured to rotate about the post and the hydraulic boom having a free second end configured to load the utility poles on to the horizontal frame and to lift the utility poles off the trailer and set in a hole, the articulated hydraulic boom having a top side facing away from the ground surface;
   a grapple coupled to the free end of the articulated hydraulic boom; and
   a hose holder secured to the top side of the articulated hydraulic boom and set back from the grapple a distance along a length of the articulated hydraulic boom, the hose holder having an opening therethrough configured to support a hose therein.

11. The utility pole setting trailer of claim 10, wherein the hose holder comprises a U-shaped band.

12. The utility pole setting trailer of claim 10, wherein the opening of the hose holder being accessible to insert or remove a hose.

13. The utility pole setting trailer of claim 10, further comprising a motor coupled to the articulated hydraulic boom and configured to power the hydraulic boom.

14. The utility pole setting trailer of claim 13, wherein the motor is configured to be coupled to a power take off (PTO) from a towing vehicle.

\* \* \* \* \*